Figure 1:
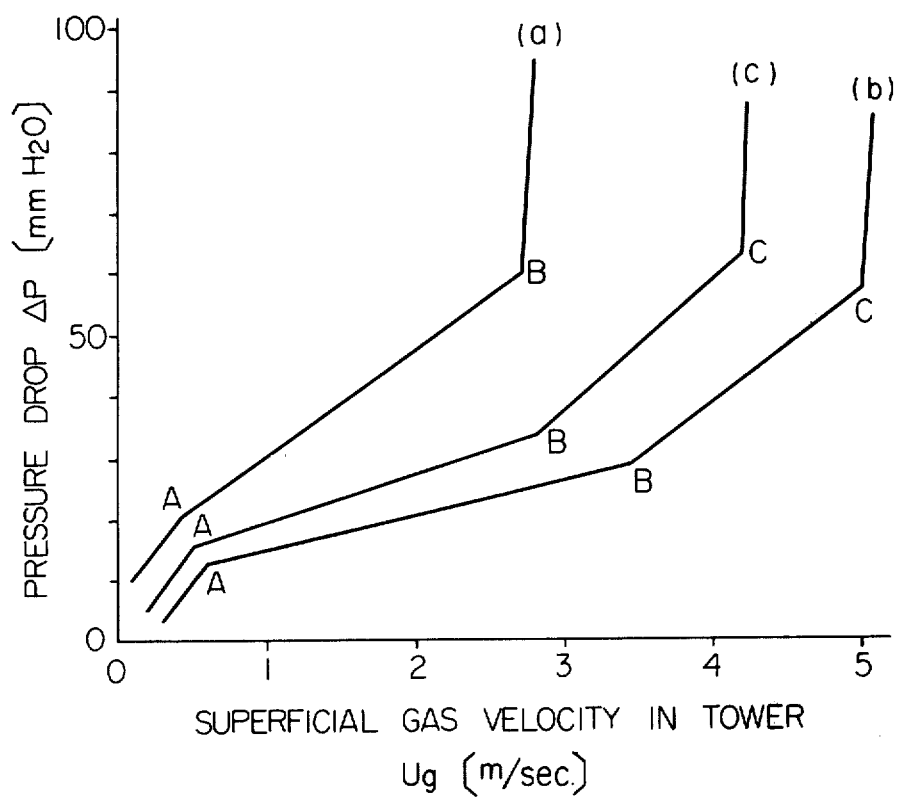

United States Patent [19]

Uchiyama et al.

[11] 3,892,837

[45] July 1, 1975

[54] PROCESS FOR REMOVING SULFUR OXIDES FROM GASES

[75] Inventors: Hisashi Uchiyama; Naohiko Meno, both of Hamamatsu; Teizo Senjo, Tokyo; Makio Kobayashi, Osaka, all of Japan

[73] Assignees: Fuji Kasui Engineering Co., Ltd.; Sumitomo Metal Industries, Ltd., Japan

[22] Filed: June 14, 1973

[21] Appl. No.: 369,834

[30] Foreign Application Priority Data

July 25, 1972 Japan............................. 47-74358
Mar. 5, 1973 Japan............................. 48-25211

[52] U.S. Cl. .............................................. 423/242
[51] Int. Cl............................................. C01b 17/00
[58] Field of Search ........................... 423/242–244; 261/113

[56] References Cited
UNITED STATES PATENTS

| | | | |
|---|---|---|---|
| 2,333,193 | 11/1943 | Peisson et al. | 423/242 |
| 2,767,966 | 10/1956 | Chave | 261/113 |
| 2,779,557 | 1/1957 | Olney et al. | 261/113 |
| 3,687,613 | 8/1972 | Rickard | 423/242 |
| 3,687,623 | 8/1972 | Tocrana et al. | 423/242 |

*Primary Examiner*—Oscar R. Vertiz
*Assistant Examiner*—Gregory A. Heller
*Attorney, Agent, or Firm*—Armstrong, Nikaido & Wegner

[57] ABSTRACT

A process for efficiently removing sulfur oxides with a very high rate from combustion exhaust gas is provided wherein gas containing sulfur oxides is passed upwardly through a perforated plate or grid plate tower without weir and downcomer, having a free-space ratio of 0.25–0.60, where said gas is contacted countercurrently with liquid absorbent containing mainly calcium carbonate in aqueous suspension under the stated conditions.

6 Claims, 8 Drawing Figures

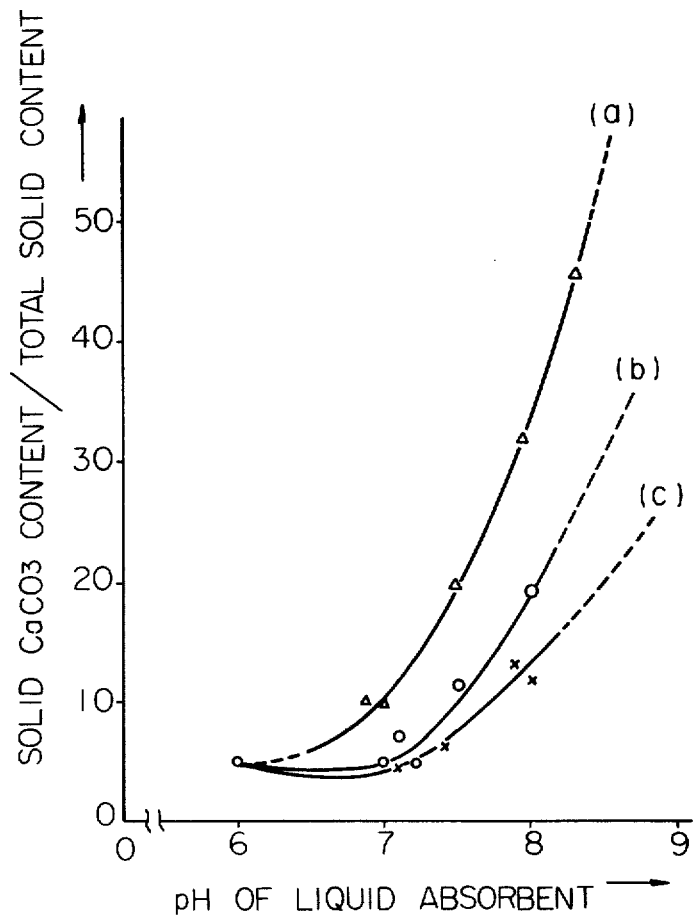

PROCESS FOR REMOVING SULFUR OXIDES FROM GASES

This invention relates to a wet process for removing sulfur oxides ($SO_x$) from combustion exhaust gas containing $SO_x$, such as, for example flue gas from a boiler, heating furnace, sintering furnace, roasting furnace, converter, smelting furnace, incinerator or the like, and more particularly, to a wet process for absorbing $SO_x$ from flue gas by bringing the gas into contact with a liquid absorbent essentially consisting of calcium carbonate in aqueous suspension in one Moredana plate tower.

The term "Moredana plate tower" as used in this specification means plate tower provided with one or more perforated plates, grid plates or the like without weir and downcomer.

Recently, due to rapidly increasing industrial production, $SO_x$, especially sulfur dioxide ($SO_2$) in said flue gas have caused serious problems of atmospheric contamination or air pollution. In order to prevent such air pollution, various flue gas desulfurization processes and apparatus have been eagerly developed and some of those have been used in industrial scale.

The processes known for the removal of $SO_x$ from flue gas are mainly classified into two types: the first type employs solid adsorbents such as activated carbon or activated manganese oxide; this is the so-called by desulfurization process, and the second type is based on the absorption reaction of $SO_2$ with suitable liquid absorbents such as aqueous sodium hydroxide solution, milk of lime or the like; this is the so-called wet sulfurization process.

Of these known processes, the wet process, compared with the dry process, has some defects. That is, scrubbed gas to be exhausted to the atmosphere becomes white fumes and has poor diffusion properties due to decreases in the temperature of the scrubbed gas. However, this wet process has become of major interest because it has the following advantages. That is, the absorption reaction proceeds more rapidly than in the dry process; the gas treating apparatus is of a small size and low cost and the operation is easy.

Heretofore, conventional wet desulfurization processes which have been proposed generally comprise the step of bringing flue gas containing $SO_x$ into contact with liquid absorbent in solution or suspension to remove $SO_x$ by employing absorption apparatus such as, for example, spray scrubber, packed tower, perforated plate tower, grid plate tower and other scrubbers. The liquid absorbent includes, for example, aqueous solution or suspension of oxides, hydroxides, carbonates and sulfites of alkali or alkali earth metals, as well as ammonia and its derivatives.

In these conventional processes, the process employing calcium compounds such as, for example, calcium oxide, calcium hydroxide and calcium carbonate as absorbent has become of major interest for the following reasons. The absorbent is cheap and commercially available, and $SO_x$ to be absorbed can be recovered as gypsum which is harmless and in great demand.

However, the conventional processes employing liquid absorbents including calcium compound in suspension have serious problems. That is, firstly, scaling or plugging occurs in the absorption apparatus and its attached apparatus, and stable continuous operation is difficult. Secondly, calcium absorbent undesirably reacts with carbon dioxide in the flue gas to be treated thereby forming calcium carbonate and therefore, the calcium absorbent to be employed for the removal of $SO_x$ is wastefully consumed. Thirdly, the rate of absorption of $SO_x$ is, in general, unsatisfactory. These disadvantages are due to absorption apparatus as well as the calcium compound employed. Specifically, as satisfactory gas-liquid contact is not obtained in the conventional absorption apparatus, a large-sized apparatus or two or more successively disposed absorption apparatus are generally utilized. Moreover, as the absorption operation is carried out with a high ratio of the liquid absorbent flow rate L ($kg/m^2 \cdot hr$) to the gas flow rate G ($kg/m^2 \cdot hr$), i.e. liquid-gas ratio (L/G), for example 10–20 in order to increase the rate of gas-liquid contact, pressure drop through the tower remarkably increases. Accordingly, installation and running costs become more expensive.

Main objects of the present invention are to obviate these problems of the aforementioned conventional wet flue gas desulfurization processes and to provide a novel wet flue gas desulfurization process which is capable of removing $SO_x$ from flue gas with an enhanced efficiency and of treating the gas economically with a compact apparatus and further of being continuously and stably operated over a long period.

Other objects and advantages of the present invention will be apparent from the following description.

In accordance with the present invention, there is provided a process for removing sulfur oxides from combustion exhaust gas containing sulfur oxides comprising the step of passing said gas upwardly through a plate tower provided with at least one perforated or grid plate without weir and downcomer, having a free-space ratio of 0.25–0.60 at a superficial gas velocity falling within the undulation region defined hereinafter, while passing a liquid absorbent downwardly through said plate tower in a countercurrent flow relationship to the upflowing gas under a liquid-gas ratio (L/G) of 0.5 or more, said liquid absorbent containing in aqueous suspension at least one calcium compound selected from the group consisting of calcium oxide, calcium hydroxide and calcium carbonate, and maintaining pH of the circulating liquid absorbent at the outlet of the tower within the range of 6–8, solid concentration of the liquid absorbent at the outlet of the tower within the range of 3–15 percent weight and a ratio of the solid calcium carbonate content to total solid content in the liquid absorbent at the outlet of the plate tower within the range of 5–35 percent by weight by supplying said calcium compound into the liquid absorbent to be circulated.

Figure 2A:
Figure 2B:
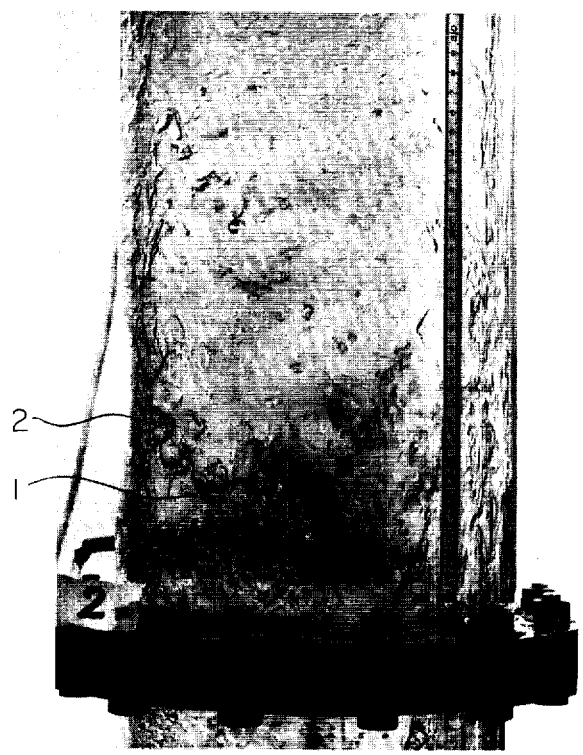
Figure 2C:
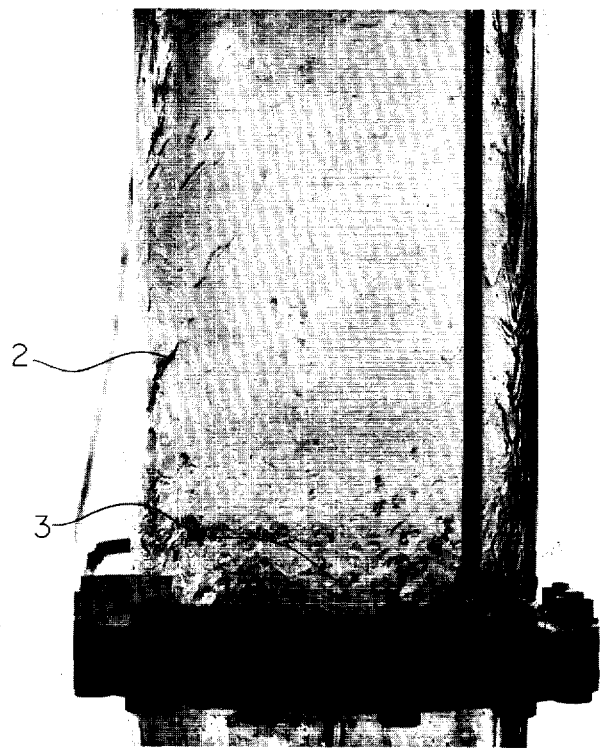
Figure 4:
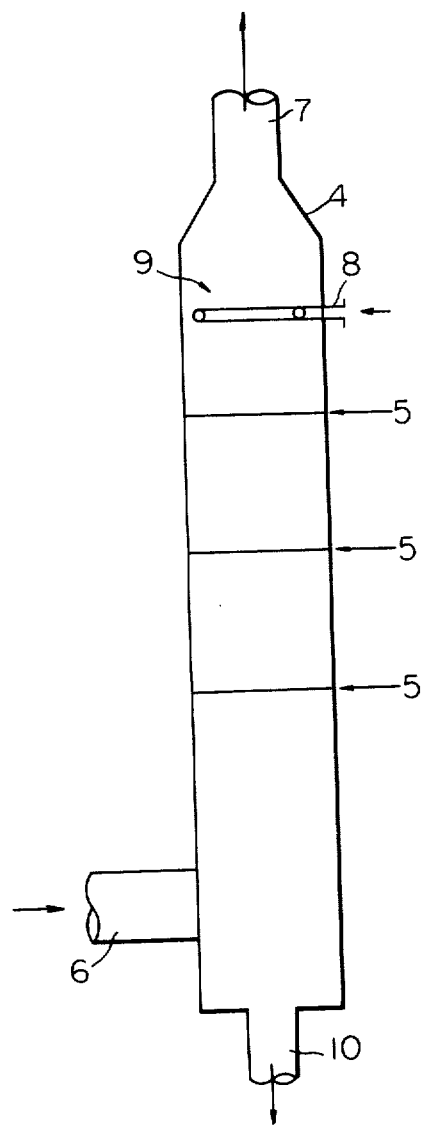
Figure 5:
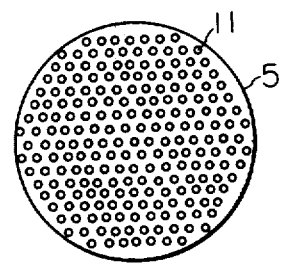
Figure 6:
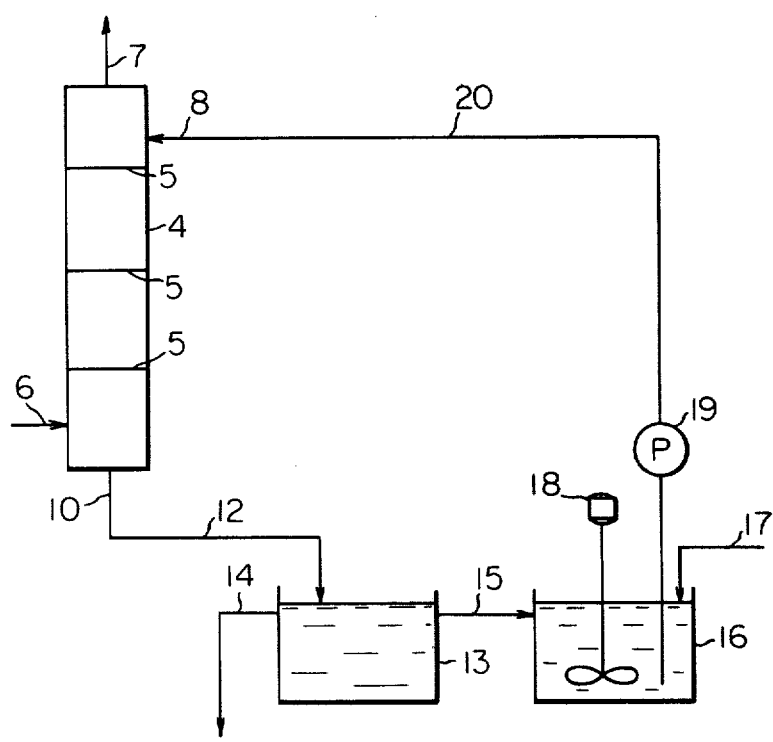

The invention will be better understood from the following description taken in connection with the accompanying drawings, but by no means limited to these drawings in which:

FIG. 1 is an explanatory graph showing the plot of pressure drop P through a plate against superficial gas velocity Ug in the Moredana plate tower, FIGS. 2A, 2B and 2C are photographs showing the state of gas-liquid mixture on the Moredana plate, FIG. 3 is an experimental graph showing the plot of pH of liquid absorbent (aqueous calcium carbonate suspension) at the outlet of the Moredana plate tower against a ratio of solid calcium carbonate content to total solid content in the liquid absorbent at the outlet of the Moredana plate tower during desulfurization operations, FIG. 4 is a schematic sectional view showing the structure of the Moredana plate tower employed in the present invention, FIG. 5 is a plan view of the Moredana plate of FIG. 4, FIG. 6 is a schematic drawing showing the process of removing $SO_x$ from flue gas according to the present invention.

A gas-absorption process employing a plate tower without weir and downcomer, i.e. Moredana plate tower, is already known. This process has become of major interest lately. This is because this process has the following advantages: uniform gas-liquid contact can be obtained even at a low liquid flow rate; large-sized apparatus can be utilized; pressure drop through a tower is relatively low, and; a gas-liquid system containing solid materials can be advantageously treated. However, in the known process wherein the plate tower without weir and downcomer is employed, maximum superficial gas velocity in the tower is limited to at most approximately 2 m/sec. Accordingly, this process also has a defect in that a large-sized apparatus is required for treating gas at a high flow rate.

For a plate-tower without downcomer, the plot of pressure drop $\Delta P$ through a plate against superficial gas velocity Ug in the tower, in the case of countercurrently contacting gas with a liquid, typically gives a straight line with breaks at two points A and B, as shown in curve (a) of FIG. 1. The curve (a) of FIG. 1 shows this plot when the free-space ratio of the plate is 0.20 and when the liquid is a 5 weight % aqueous $Na_2CO_3$ solution. The point A of curve (a) is the point where the liquid begins to be retained on the plate. When the superficial gas velocity Ug is lower than that of the point A, the liquid falls down through the holes of the plate without being retained on the plate. This state is called weeping. As the superficial gas velocity Ug increases from the point A to the point B, the gas passing through the liquid layer on the plate is, at first, in a bubbling state; and afterwards it changes gradually to a foaming or frothing state. Between the point A and the point B, resistance or pressure drop increases with a relatively gentle slope.

When superficial gas velocity Ug reaches the point B, pressure drop $\Delta P$ through the plate and height of the liquid-gas mixture layer on the plate increase rapidly and, finally, flooding occurs. In this flooding state, stable operation can not be performed. Heretofore, the point B has been referred to as "point of maximum permissible gas velocity" and the superficial gas velocity at the point B has been referred to as "maximum permissible gas velocity." Namely, for a plate-tower without downcomer exhibiting the behavior as shown in the curve (a) of FIG. 1, the region between the point A and the point B is a stable working region and the point B substantially corresponds to the flooding point. A plate without downcomer having a free-space ratio (total area of holes in plate/plate area) of approximately 0.08–0.20, in general, shows the curve (a) in FIG. 1.

It has now been found that the plot of pressure drop $\Delta P$ through a plate against superficial gas velocity Ug gives a curve similar to a curve (b) in FIG. 1 when a Moredana plate having a free-space ratio of 0.25–0.60 is employed. The curve (b) in FIG. 1 shows the plot of pressure drop $\Delta P$ through a plate against superficial gas velocity Ug when the free-space ratio of the Moredana plate is 0.31 and when the liquid is 5 weight % aqueous $Na_2CO_3$ solution.

In the curve (b) of FIG. 1, the liquid is retained on the plate at a region exceeding the point A, and pressure drop $\Delta P$ gradually increases with an increase of superficial gas velocity Ug between the points A and B, similar to in the curve (a) of FIG. 1. However, in this case flooding does not occur on exceeding the point B, and up to a point C of curve (b) the plot $\Delta P$ against Ug gives a straight line with a little higher slope than that of the line between the points A and B. On reaching the point C the increase of the pressure drop $\Delta P$ is rapid and flooding occurs. As it is usually difficult to clearly observe the exact flooding point, the point C may be referred to as flooding point for convenience's sake.

A state of the gas-liquid mixture on the Moredana plate between the ponts B and C is as follows. In this region the liquid stream and gas stream are mixed effectively on the plate and the group of blocks, each composed of the gas-liquid mixture in a state of foam or froth, is formed on the plate. These blocks move vigorously up and down repeatedly in the liquid-gas layer on the plate. A part of the fallen blocks is broken, and then new blocks are formed and immediately rise. Thus, the mixing of the gas phase and liquid phase can be effectively done, the interfacial area between gas and liquid increases and both liquid laminar film and the liquid-gas interface are renewed constantly.

Therefore, the region between the points B and C in the curve of the type similar to the curve (b) of FIG. 1 is herein defined as "undulation region," and the point B and the point C are termed "minimum gas velocity of undulation region" and "maximum gas velocity of undulation region," respectively.

Curve (c) in FIG. 1 shows the plot of pressure drop $\Delta P$ through a Moredana plate against superficial gas velocity Ug when the free-space ratio of the plate is 0.35 and when the liquid is an aqueous 5 weight % $CaCO_3$ suspension. The curve (c) of FIG. 1 also has the undulation region $\overline{BC}$ and shows the same behavior as the curve (b) of FIG. 1.

FIGS. 2A and 2B shows states at a point of Ug 4.0 m/sec positioned in the undulation region, i.e. between the points B and C, in the curve (b) of FIG. 1. FIG. 2C shows a state at a point of Ug 1.8 m/sec positioned in the stable working region, i.e. between the points A and B, in the curve (b) of FIG. 1. As mentioned hereinbefore, in the undulation region the gas-liquid mixture moves up and down repeatedly and furiously in the form of the group of blocks each composed of minute foams or froths. Such block is indicated by reference numeral 1 in FIGS. 2A and 2B and has an appearance similar to a cloud in the photographs. FIGS. 2A and 2B show the moments at which the block 1 is at the highest position and the lowest position, respectively, of the movement of the block.

In contrast, at the point of Ug 1.8 m/sec positioned in the region which has been heretofore called a stable working region, i.e. between the points A and B in the curve (b) of FIG. 1, the gas-liquid mixture is in the state of foaming or frothing, which state is indicated by reference numeral 3 in FIG. 2C. In FIGS. 2A, 2B and 2C, reference numeral 2 indicates liquid moving down along the inner surface of the tower.

In the desulfurization process of the present invention wherein the undulation region $\overline{BC}$ as shown in the curve (c) of FIG. 1 is employed, the liquid-gas ratio (L/G) is 0.5 or more, preferably 1-20 for practical use and more preferably 3-5. When the value of L/G is less than 0.5, the rate of mass transfer decreases at the superficial gas velocity of less than the minimum undulation velocity, i.e. the point B in the curve (c) of FIG. 1 due to low liquid flow rate and, therefore a satisfactory rate of desulfurization cannot be obtained. On the other hand, when L/G goes up to an extremely high value, the pressure drop through the plate becomes higher. Therefore, maximum L/G is preferably limited to approximately 20 for practical use.

In general, the range of the free-space ratio is from 0.25 to 0.60, preferably between 0.30 and 0.50 for practical use. When the free-space ratio is lower than 0.25, available range of the liquid flow rate is narrow and pressure drop through the plate increases undesirably. In contrast, when the free-space ratio is higher than 0.60, the undulation region BC appears only in the case of excessively high superficial gas velocity which leads to an undesirable increase of pressure drop through the plate.

The absorbent to be supplied into the circulating liquid absorbent of the present invention includes calcium oxide, calcium hydroxide and calcium carbonate. These calcium compounds may be used alone or in combination. However, the liquid absorbent to be circulated into the Moredana plate tower contains mainly calcium carbonate as an absorbent component described hereinafter, and, when calcium oxide and/or calcium hydroxide is the absorbent to be supplied, the liquid absorbent contains in addition to calcium carbonate, small amounts of calcium oxide and/or calcium hydroxide. The liquid absorbent also contains small amounts of calcium bicarbonate which exists in equilibrium with dissolved calcium carbonate in the liquid absorbent. Accordingly, the principal reaction of the desulfurization of the present invention may be expressed by the following equation (1):

$$CaCO_3 + SO_2 = CaSO_3 + CO_2 \tag{1}$$

Some of the calcium sulfite so formed is oxidized to calcium sulfate with oxygen contained in flue gas to be treated, in the Moredana plate tower as shown by the following equation (2):

$$CaSO_3 + \tfrac{1}{2}O_2 = CaSO_4 \tag{2}$$

Thus, the circulating liquid absorbent in aqueous suspension through the Moredana plate tower according to the present invention also contains calcium sulfite, calcium sulfate and carbon dioxide, as well as the above-mentioned compounds. A part of carbon dioxide dissolved in the liquid absorbent originates in carbon dioxide contained in flue gas to be treated, which usually contains two to ten-odd percent of carbon dioxide. Accordingly, when milk of lime is supplied into the circulating liquid absorbent system, calcium hydroxide in the milk of lime is converted into calcium carbonate through the reaction with the dissolved carbon dioxide and calcium bicarbonate, which reactions are expressed by the following equations (3) and (4), respectively:

$$Ca(OH)_2 + CO_2 = CaCO_3 + H_2O \tag{3}$$

$$Ca(OH)_2 + Ca(HCO_3)_2 = 2CaCO_3 + 2H_2O \tag{4}$$

Thus, in the circulating liquid absorbent calcium mainly exists in the form of calcium carbonate. As the reactions (3) and (4) are substantially performed before the liquid absorbent goes into the tower, reaction of carbon dioxide contained in flue gas to be treated with calcium hydroxide or calcium oxide does not substantially occur inside the Moredana plate tower. For this reason, formation of scale is effectively avoided.

Now, it has been found that solid concentration of the liquid absorbent at the outlet of the Moredana plate tower (i.e. concentration of the total solid of $CaSO_3$, $CaSO_4$ and $CaCO_3$), ratio of solid calcium carbonate content to said total solid content at the outlet of the Moredana plate tower and pH of the liquid absorbent at the outlet of the Moredana plate tower have a great effect on the rate of desulfurization, plugging trouble of desulfurization apparatus and unit consumption of calcium compound (absorbent).

In the present desulfurization process, pH of the liquid absorbent at the outlet of the Moredana plate tower is controlled between 6 and 8, preferably between 6.5 – 7.5. When the pH of the liquid absorbent is less than 6, rate of sulfurization decreases. This is because calcium bisulfite $Ca(HSO_3)_2$ is formed in the liquid absorbent below pH 6 and sulfur dioxide vapor is generated from sulfurous acid which derives from an equilibrium relation with bisulfite ion $HSO_3^-$ as shown in the following equation (5):

$$HSO_3^- + H^+ \rightleftarrows H_2SO_3 \tag{5}$$

On the contrary, when the pH is more than 8, rate of desulfurization also decreases except that the ratio of solid calcium carbonate content to total solid content in the liquid absorbent is increased. However, if the ratio is increased, the absorbent is wastefully consumed and plugging trouble of the apparatus is caused by excess calcium ion in the liquid absorbent.

In the present desulfurization process, the ratio of solid calcium carbonate content to total solid content in the liquid absorbent at the outlet of the Moredana plate tower is controlled within the range of 5-35 percent by weight, preferably of 5-20% by weight. Though unit consumption of the calcium absorbent preferably decreases as said ratio is smaller, solid concentration of the liquid absorbent has to be increased in order to keep a satisfactory rate of desulfurization. Accordingly, when said ratio is less than 5 percent by weight, it is undesirable for practical use because of an increase of pressure drop through the tower. In this instance, when a liquid-gas ratio (L/G) is decreased in order to reduce the pressure drop through the tower, rate of desulfurization decreases unsatisfactorily. On the other hand, as the ratio of solid calcium carbonate content to total solid content goes up, the amount of calcium carbonate being lost increases undesirably because some of the liquid absorbent which would have been circulated through the tower is, in general, pumped out continuously or in batches. Accordingly, a maximum ratio of solid calcium carbonate content to total solid content in the liquid absorbent is limited to 35 percent by weight for practical use.

Further, in the present desulfurization process, solid concentration of the circulating liquid absorbent at the outlet of the Moredana tower is controlled within the range of 3–15 percent by weight, preferably within the range of 5–15 percent by weight. When the solid concentration is less than 3 percent by weight, rate of desulfurization decreases due to drop of pH of the liquid absorbent unless a ratio of solid calcium carbonate content to total solid content in the liquid absorbent is increased. Accordingly, the absorbent to be supplied is required in excess, in order to maintain a satisfactory rate of desulfurization. On the other hand, if the solid concentration of the liquid absorbent is more than 15 percent by weight, pressure drop through the tower increases under a constant liquid-gas ratio (L/G) operation. When liquid-gas ratio (L/G) is lowered in order to lower the pressure drop, rate of desulfurization decreases.

It will be understood that a person having an ordinary skill in the art will easily be able to control pH of the liquid absorbent, solid concentration of the circulating liquid absorbent and the ratio of solid calcium carbonate content to total solid content in the liquid absorbent, all at the outlet of the tower by adjusting amount and concentration of said absorbent to be supplied to the circulating liquid absorbent in accordance with certain operating conditions.

Referring to FIG. 3, three curves (a), (b) and (c) show relationship between pH of the liquid absorbent at the outlet of the tower and ratio of solid calcium carbonate content to total solid content in the liquid absorbent at the outlet of the tower, plotted for solid concentration of the liquid absorbent. The relation of these three factors in FIG. 3 is obtained by plotting experimental data when the rate of desulfurization is almost 100 percent. These data were obtained by treating gas containing $SO_x$ and by using milk of lime as the absorbent to be supplied in the Moredana plate tower comprising three perforated plates each having a free-space ratio of 0.35 under a liquid-gas ratio (L/G) of 3 – 4 and a superficial gas velocity of approximately 3 m/sec.

In FIG. 3, curves (a), (b) and (c) show the relation when 5, 10 and 15 percent by weight of solid concentration of the liquid absorbent were employed respectively.

In accordance with the present invention, almost 100 percent of rate of desulfurization can be achieved by contacting gas with liquid absorbent countercurrently at a high superficial gas velocity falling within the undulation region $\overline{BC}$ of the curve (c) in FIG. 1, and at a stated liquid-gas ratio (L/G) in the Moredana plate tower, and by controlling each pH of the liquid absorbent, solid concentration of the liquid absorbent and the ratio of solid calcium carbonate to total solid content in the liquid absorbent, all at the outlet of the tower, within the respective stated ranges.

Further, in accordance with the present invention, the desulfurization operation can be carried out under a very low liquid-gas ratio (L/G) in comparison with the conventional process, so that pressure drop through the tower is remarkably low.

Further, in accordance with the present invention, as interaction of the absorbent to be supplied and carbon dioxide in gas to be treated does not substantially take place inside the Moredana plate tower, unit consumption of the absorbent to be employed in the present process decreases, (e.g. unit consumption of calcium 1.05–1.50), trouble caused by plugging in the apparatus can be avoided and stable continuous operation can be performed over a long period of time at low cost.

Other features of the process according to the present invention are as follows. As the overall mass-transfer coefficient of the tower is high and gas can be treated at a higher superficial gas velocity in comparison with the conventional process, construction cost of the present desulfurization process is considerably lowered and area required for the equipment is minimized.

Now, the preferred embodiments of the present invention will be illustrated with reference to the accompanying FIGS. 4, 5 and 6.

Referring to FIG. 4, numeral 4 designates a Moredana plate tower which comprises three perforated plates 5 without weir and downcomer. As shown in FIG. 5, the plate 5 has a plurality of holes 11 and its free-space ratio (total area of holes in the plate/plate area) is approximately 0.31. The Moredana plate tower 4 further comprises: a gas inlet 6 for feeding gas to be treated; a gas outlet 7 for discharging the scrubbed gas; a liquid inlet 8 for feeding liquid absorbent; a distributor 9 for uniformly distributing the liquid absorbent fed through the liquid inlet 8 over the entire perforated plate, and a liquid outlet 10 for discharging the liquid absorbent.

In the process flow shown in FIG. 6, flue gas containing $SO_2$, $CO_2$ amd so on is continuously fed through the gas inlet 6 into the Moredana plate tower comprising three perforated plates 5, where it is treated with down-flowing liquid absorbent containing mainly calcium carbonate in aqueous suspension. The scrubbed gas, i.e. $SO_2$-free gas is discharged through the gas outlet 7. On the other hand, the liquid absorbent fed through the liquid inlet 8 is discharged through the liquid outlet 10. This liquid absorbent discharged from the liquid outlet 10 contains excess calcium carbonate in the circulating liquid absorbent and carbon dioxide dissolved from the gas, as well as the reaction products (i.e. $CaSO_3$ and $CaSO_4$).

Then, the liquid absorbent from the tower 4 is introduced into a receiving tank 13 through a pipe 12. A portion thereof is separated through a pipe 14 and the remainder is transferred into a feeding tank 16 through a pipe 15. The separated liquid absorbent in slurry through the pipe 14 is transferred into another process, where it is treated by an appropriate method, for example, conversion to gypsum.

In the feeding tank 16, a calcium compound selected from calcium oxide, calcium hydroxide and/or calcium carbonate in aqueous suspension is supplied through a pipe 17 to control within stated ranges, pH of the liquid absorbent, solid concentration of the liquid absorbent and a ratio of solid calcium carbonate content to total solid content in the liquid absorbent, all at the outlet 10 of the tower 4. An agitator 18 is mounted in the feeding tank 16 for rendering uniform the concentration of the liquid absorbent in suspension. Then, controlled liquid absorbent is fed into the tower 4 through a pipe 20 by means of a pump 19. Thus, the liquid absorbent is continuously circulated through the tower 4 during the operation.

The temperature of the circulating liquid absorbent is not particularly limited, but is, in general, between 50° and 80°C.

The present invention is further illustrated by, but by no means limited to, the following Example.

EXAMPLE

Combustion exhaust gas of fuel oil, containing 800–1,000 ppm of sulfur dioxide ($SO_2$), 13 percent of carbon dioxide ($CO_2$) and 4 percent of oxygen ($O_2$) at approximately 230°C was introduced into the bottom of a Moredana plate tower after it was cooled to 60°–65°C in a conventional water-cooling chamber. The Moredana plate tower had a diameter of 1.5 m and was provided with three perforated plates each having holes of a 5 mm diameter and a free-space ratio of 0.35. The gas at a flow rate of 15,000–17,500 $Nm^3/hr$ was passed upwardly in countercurrent flow to a liquid absorbent which fell downwardly in the tower at a flow rate of 60–70 $m^3/hr$ and at approximately 60°C with a liquid-gas ratio (L/G) of 3–4. The liquid absorbent was in an aqueous suspension and contained solids of calcium carbonate ($CaCO_3$), calcium sulfite ($CaSO_3$) and calcium sulfate ($CaSO_4$). The desulfurization was carried out in the flow as shown in FIG. 6 and the operation conditions and the results are shown in Table 1.

Further, $CO_2$ content of the scrubbed gas at the outlet of the tower was 13 percent and pH of the liquid absorbent at the inlet of the tower was 9.5–10.5 under the following conditions:

| | |
|---|---|
| pH of the liquid absorbent at the outlet of the tower | 6 – 8 |
| Ratio of solid $CaCO_3$ content to total solid content in the liquid absorbent at the outlet of the tower | 5 – 35 wt.% |
| Solid concentration of the liquid absorbent at the outlet of the tower | 3 – 15 wt.% | comprises passing said gas upwardly through a plate tower provided with at least one perforated or grid plate without weir and downcomer, and subsequently passing a liquid absorbent containing calcium carbonate in aqueous suspension downwardly through said plate tower in countercurrent flow relationship to the upflowing gas; the improvement in which a. said perforated or grid plate has a free-space ratio of 0.25–0.60,
b. the upflowing has had a superficial gas velocity in the tower within the region exhibiting undulation,
c. the ratio of the liquid absorbent flow to the gas flow (L/G) is 0.5 or more, and
d.
   1. the pH of the circulating liquid absorbent,
   2. total solid content in the liquid absorbent and
   3. ratio of solid calcium carbonate content to the total solid content in the liquid absorbent, all at the outlet of the tower, are maintained within the range of 6–8, 3–15 wt% and 5–35 wt%, respectively, and each of (1), (2) and (3) are obtained by supplying at least one calcium compound selected from the group consisting of calcium oxide, calcium hydroxide and calcium carbonate to the circulating liquid absorbent.

2. The process as claimed in claim 1, wherein said liquid-gas ratio (L/G) is between 0.5 and 20.

3. The process as claimed in claim 1, wherein said freespace ratio of the plate is between 0.30 and 0.50.

4. The process as claimed in claim 1, wherein said pH of the liquid absorbent at the outlet of the tower is between 6.5 and 7.5.

5. The process as claimed in claim 1, wherein said solid concentration of the liquid absorbent at the outlet of the tower is between 5 and 15% by weight.

6. The process as claimed in claim 1, wherein said ratio of solid calcium carbonate content to total solid Table 1

| Run No. | Superficial gas velocity in tower (m/sec) | pH of liquid absorbent at outlet of tower | Solid concentration of liquid absorbent (%) | (Solid $CaCO_3$ content)/ (Total solid content) (%) | $SO_2$ at inlet of tower (ppm) | $SO_2$ at outlet of tower (ppm) | Rate of desulfurization (%) | Excess $CaCO_3$ (%) | Pressure drop in tower (mmH$_2$O) |
|---|---|---|---|---|---|---|---|---|---|
| 1 | 2.9 | 6.9 | 5 | 10 | 870 | 2 | 99.8 | 11 | 75 |
| 2 | 3.0 | 7.2 | 10.3 | 5 | 960 | 3 | 99.7 | 5.5 | 95 |
| 3 | 3.2 | 7.9 | 14.8 | 13 | 910 | trace | 100 | 15 | 125 |
| 4 | 3.0 | 7.0 | 4.7 | 2 | 890 | 90 | 90 | 2 | 70 |
| 5 | 3.1 | 9.0 | 19 | 26 | 930 | 19 | 98 | 35 | Ca. 250 |

Note 1: Runs No. 4 and No. 5 are comparative examples.
Note 2: In Runs No. 1 - No. 4, plugging or blocking did not generate in the tower during operation, but in Run No. 5, blockage occurred in the tower and it was difficult to carry out stable continuous operation.

What we claim is:

1. In a process for removing sulfur oxides from a combustion exhaust gas containing sulfur oxides which content in the liquid absorbent is between 5 and 20 percent by weight.

* * * * *